April 1, 1958 A. TYKULSKY 2,829,349

ELECTRICAL FILTER CIRCUIT CONSTRUCTION

Filed Nov. 6, 1952

*INVENTOR.*

ALEXANDER TYKULSKY

*BY*

*Lockwood, Galt, Woodard, & Smith*

ATTORNEYS 2,829,349
Patented Apr. 1, 1958

2,829,349

ELECTRICAL FILTER CIRCUIT CONSTRUCTION

Alexander Tykulsky, Indianapolis, Ind., assignor to I. D. E. A. Incorporated, Indianapolis, Ind., a corporation of Indiana Application November 6, 1952, Serial No. 319,047

5 Claims. (Cl. 333—70)

This invention relates to an electrical circuit construction, and more particularly to an electrical circuit construction which incorporates therein both inductor and capacitor component parts.

In accordance with conventional practice, electronic or radio circuits which include suitably connected components, such as condensers, resistors and inductors, have the component parts thereof conductively connected together by means of wires and soldered joints. The component parts themselves are constituted by individual assemblies having lead wires extending therefrom which are suitably soldered into the associated circuitry, and these parts are normally considered as separate cost items, since they must be fabricated in accordance with adopted processes and then merchandised and used as component parts. Entire industries are devoted to the manufacture of these component parts, thus it is obvious that each of such component parts which may be used in a given electronic circuit, constitutes an item of cost which contributes to the final cost of the finished construction paid by the consumer.

It is, therefore, an object of this invention to provide an electrical circuit construction which eliminates the use of certain component parts in assembled circuit construction thereby contributing to the economy and simplicity of such construction.

It is another object of this invention to provide an electrical circuit construction incorporating both condenser and inductor parts which are electrically coupled together in a manner which does not require use of soldered joints.

It is a further object of this invention to provide an electrical circuit construction which incorporates essentially only one fabricated component part, and which may be used in conjunction with another identical or similar part to provide a different electrical component part in conjunction therewith, e. g. the first mentioned component part which is fabricated could be an ordinary coil, while the latter mentioned component part could be a condenser which is electrically coupled to the coil.

It is a still further object of this invention to provide an elemental electrical filter construction which incorporates both condensers and inductors without the use of either soldered connections or the use of conventional condensers.

It is a still further object of this invention to provide an electrical filter construction which incorporates both inductors and condensers, with the condensers being constituted by the ends of the inductor leads.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In accordance with this invention, a high frequency filter circuit, which may be used in conjunction with conventional very high frequency or ultra-high frequency television receivers, is provided by the assembly of two helical coil inductors having the leads thereof overlapped in symmetrical relation whereby the overlapping leads serve as condenser parts electrically coupled to the two coils.

For a better understanding of the invention, reference is made to the following description, taken in connection with the accompanying drawing. In the drawings.

Figure 1:
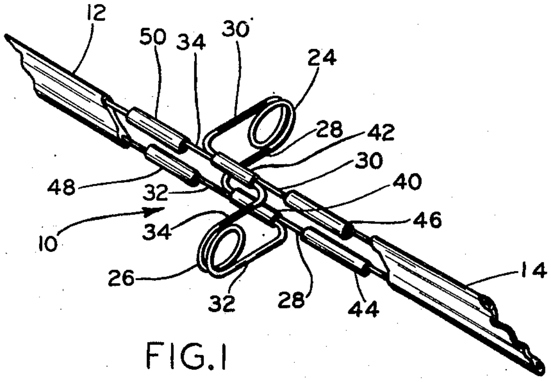
Fig. 1 is a perspective illustration of an embodiment of this invention.
Figure 4:
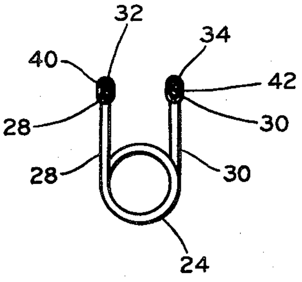
Fig. 4 is a cross-section taken substantially on section line 4—4 of Figs. 2 and 3.

Referring to the drawings, an electric filter construction, generally indicated by the reference numeral 10, is shown as being connected between the ends of two sections of commercially available 300 ohm, two-lead transmission line 12 and 14, this transmission line being conventionally used in conjunction with television receiver antenna installations.

The transmission line 12 has two end leads 16 and 18 extending therefrom, and the line 14 has leads 20 and 22 extending therefrom.

The filter construction 10 comprises two oppositely disposed helical coils 24 and 26, which in the present embodiment are identical. Preferably, these coils and all of the wire leads are covered with conventional enamel paint insulation, for a purpose which will become apparent hereafter.

Figure 2:
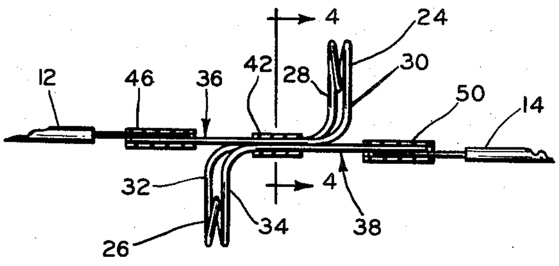
Fig. 2 is a side elevation thereof in part longitudinal section.
Figure 3:
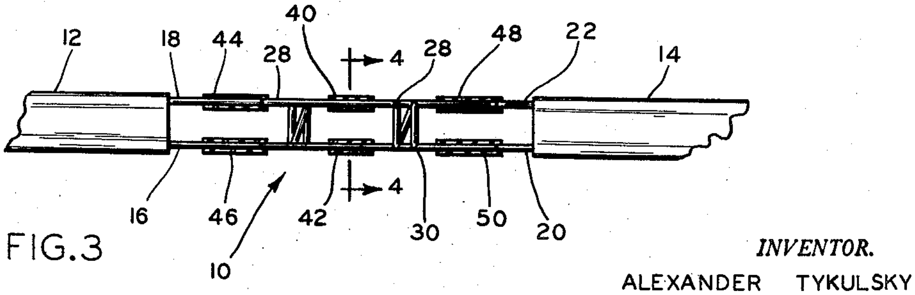
Fig. 3 is a plan view in part longitudinal section.

Each of the coils 24 and 26 has two parallel extending spaced wire leads, leads 28 and 30 being integrally connected to coil 24, and leads 32 and 34 being integrally connected to the coil 26. In the preferred arrangement, these coil leads are provided with right angle bent portions 36 and 38, which, in the illustrated assembly, extend in opposite directions so as to enable the overlapping of a suitable length of both leads 36 and 38 in the manner shown in the drawings (see Fig. 2). In this overlapping relationship, a portion of wire 28 axially overlaps a corresponding portion of wire 32, and correspondingly, a portion of wire 30 overlaps a portion of wire 34.

As clearly shown in the drawings, the construction contemplates a symmetrical arrangement of parts, with the two coils 24 and 26 being arranged on opposite sides of the general plane defined by the overlapping leads 28, 30 and 32, 34. It will therefore occur to a person skilled in the art that this particular symmetrical arrangement conduces to an electrically balanced filter circuit which under certain conditions is necessary for proper filtering operation.

As stated previously, the wires and leads are covered with enamel insulation thereby preventing direct current connection between the circuits of the two coils 24 and 26.

The lead sections 36 and 38 of the two coils 24 and 26, respectively, are maintained in overlapping, axially extending relationship by the use of two tubular members 40 and 42 which are telescoped, respectively, over the overlapping portions of wires 28, 32 and 30, 34. These tubular members are preferably made of flexible insulating plastic material, such as is conventionally used as insulation for wires in radio circuits, and is provided with an internal opening which is of such size as to clamp securely the overlapping portions of the aforementioned wires together.

With the arrangement or assembly thus far described, a filter circuit construction is provided, with the opposite end extremities of the leads 36 and 38 serving as the input and output circuit-connecting leads of the filter. With reference to the equivalent circuit diagram of Fig. 5, the ends of the coils 24 and 26 are shown as being connected together, respectively, by the overlapping leads forming condensers designated in Fig. 5 by reference numerals 28, 32 and 30, 34, respectively. The leads 36 and 38 extend from the opposite ends of the two coils 24 and 26, respectively, for connection into appropriate parts of associated circuitry.

The filter circuit assembly thus far described may be incorporated in the transmission line system of a television receiving installation by overlapping end portions, for example, of transmission line leads 18 and 28, and 16 and 30, respectively, on the one hand, and leads 22 and 32, and 20 and 34, respectively, on the other hand.

Figure 5:
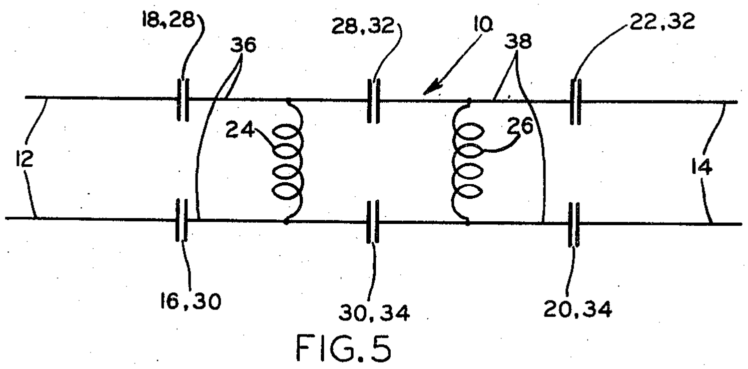
Fig. 5 is an equivalent circuit diagram of the foregoing figures.

Tubular members which are similar to the previously described members 40 and 42, bearing the reference numerals 44, 46, 48 and 50, are, respectively, used to secure the aforesaid transmission line leads together, thereby providing coupling condensers which are appropriately indicated by reference numerals in the circuit diagram of Fig. 5.

From the foregoing it will be apparent that no prefabricated conventional condensers are used in the particular filter construction, the overlapping lead wires from the two coils 24 and 26 serving as the condensers of the filter, and further the remaining overlapping lead wire portions serving as coupling condensers for connecting the filter construction into the external circuit system. The enamel insulation on the various lead wires serve as the dielectric for the condensers, and it is of importance to note that the parameters of these condensers may be easily adjusted to suit design and operational desiderata by varying the extent of overlap of the various lead portions.

From the foregoing it will also be apparent that the filter construction does not utilize soldered connections either in the filter construction itself or in the connection of such filter into the associated external circuitry.

It will be obvious that the fabrication of the foregoing embodiment is the ultimate in simplicity, and constitutes a considerable savings in cost when compared to the conventional circuit constructions, the principal components of this construction being only wire and suitable insulating clamps.

While only a two section filter circuit has been shown and described, it is obvious that any number of elemental filter sections such as the one just described, may be assembled together to provide a multi-section filter, and by using suitably sized collars 24 and 26, filter circuits having suitable response curves may be easily provided.

By following the teachings of the foregoing, the circuit construction may be said to incorporate both fixed and variable condensers, variation in capacity of the condensers being achieved by changing the overlapping lengths of the coil leads.

What is claimed is:

1. A frequency sensitive circuit construction comprising a first inductance having two parallel spaced leads arranged in first and second straight-line lengths at an angle to each other, the first length extending from the inductance, a second inductance also having two parallel spaced leads arranged in first and second straight-line lengths at an angle to each other, the first length of lead of the second inductance extending from the latter, the second lengths of both inductances being disposed in contiguous longitudinally extending relationship, respectively, in such a manner that the two inductances will be symmetrically positioned on the contiguous second lengths, said contiguous second lengths being arranged in such a manner as to provide a parallel conductor constant impedance transmission line, the spaced leads of the respective second lengths being contiguous with each other, the second length of said first inductance constituting an input connection and the second length of said second inductance constituting an output connection, and means carried by said leads for securing said second lengths in the aforementioned relationship, all of said contiguous leads being electrically insulated from each other.

2. A frequency sensitive circuit construction comprising a first inductance having two parallel spaced leads arranged in first and second straight-line lengths at an angle to each other, the first length extending from the inductance, a second inductance also having two parallel spaced leads arranged in first and second straight-line lengths at an angle to each other, the first length of lead of the second inductance extending from the latter, the second lengths of both inductances being disposed in contiguous longitudinally extending relationship, respectively in such a manner that the two inductances will be symmetrically positioned on the contiguous second lengths, said contiguous second lengths being arranged in such a manner as to provide a parallel conductor constant impedance transmission line, the spaced leads of the respective second lengths being contiguous with each other, the second length of said first inductance constituting an input connection and the second length of said second inductance constituting an output connection, and two members encircling the respective contiguous leads for securing the latter in place with respect to each other, the respective contiguous leads being insulated from each other.

3. A frequency sensitive circuit construction comprising a first inductance having two insulation covered parallel spaced leads arranged in first and second straight-line lengths at an angle to each other, the first length extending from the inductance, a second inductance also having two insulation covered parallel spaced leads arranged in first and second straight line lengths at an angle to each other, the first length of lead of the second inductance extending from the latter, the second lengths of both inductances being disposed in contiguous longitudinally extending relationship, respectively, in such a manner that the two inductances will be positioned on opposite sides of the contiguous second lengths, the spaced leads of the respective second lengths being contiguous with each other, the second length of said first inductance constituting an input connection and the second length of said second inductance constituting an output connection, and means carried by said leads for securing said second lengths in the aforementioned relationship.

4. A frequency sensitive circuit construction comprising two substantially identical coils, each coil having two parallel leads which first extend away from the respective coil at an angle normal to the axis of the coil and then secondly in a direction substantially parallel with said axis, the axially extending portions of said leads, having portions arranged in overlapping relation with each lead of one coil axially overlapping a portion of a respective lead of the other coil thereby leaving an end section of each lead free and fully exposed for connection to external circuitry, the end sections of one coil constituting an input connection and the end sections of the other coil constituting an output connection, and two individual clamping devices telescoped over securing the respective overlapping portions together, said overlapping portions being insulated from each other whereby they serve as the plates of a condenser.

5. A frequency sensitive circuit construction comprising a first inductance having two parallel spaced leads arranged in first and second lengths at an angle to each other, the first length extending from the inductance, a second inductance also having two parallel spaced leads arranged in first and second lengths at an angle to each other, the first length of lead of the second inductance extending from the latter, the second lengths of both inductances being disposed in contiguous longitudinally extending relationship, respectively, said contiguous second lengths being insulated from each other, the second length of said first inductance constituting an input connection and the second length of said second inductance constituting an output connection, and means carried by said leads for securing said second lengths in the aforementioned relationship.

References Cited in the file of this patent

UNITED STATES PATENTS

| | | |
|---|---|---|
| 1,744,091 | Wrape | Jan. 21, 1930 |
| 1,744,092 | Wrape | Jan. 21, 1930 |

| | | |
|---|---|---|
| 1,866,271 | Schroter | July 5, 1932 |
| 2,161,192 | Peterson | June 6, 1939 |
| 2,189,284 | Fritz | Feb. 6, 1940 |
| 2,194,696 | Eickemeyer et al. | Mar. 26, 1940 |
| 2,204,175 | Carter | June 11, 1940 |
| 2,208,939 | Ruska | July 23, 1940 |
| 2,216,964 | Stepp | Oct. 8, 1940 |
| 2,259,510 | Alford | Oct. 21, 1941 |
| 2,417,290 | Brown | Mar. 11, 1947 |
| 2,530,995 | Rumpf | Nov. 21, 1950 |
| 2,564,740 | Toth | Aug. 21, 1951 |
| 2,627,579 | Wasmansdorff | Feb. 3, 1953 |
| 2,769,169 | Munzig | Oct. 30, 1956 |

U. S. DEPARTMENT OF COMMERCE

PATENT OFFICE

CERTIFICATE OF CORRECTION

Patent No. 2,829,349 Alexander Tykulsky April 1, 1958

It is hereby certified that error appears in the printed specification of the above numbered patent requiring correction and that the said Letters Patent should read as corrected below.

Column 4, line 64, strike out "telescoped over".

Signed and sealed this 24th day of June 1958.

(SEAL)
Attest:

KARL H. AXLINE
Attesting Officer

ROBERT C. WATSON
Commissioner of Patents